United States Patent [19]

Novikoff et al.

[11] 4,016,553
[45] Apr. 5, 1977

[54] ARTICLE DETECTION SYSTEM WITH NEAR FIELD ELECTROMAGNETIC WAVE CONTROL

[75] Inventors: Eugene B. Novikoff, Woodbury; Ronald Pruzick, Commack, both of N.Y.

[73] Assignee: Knogo Corporation, Hicksville, N.Y.

[22] Filed: June 27, 1975

[21] Appl. No.: 590,913

[52] U.S. Cl. .............................. 340/280; 340/258 C; 343/867; 325/365
[51] Int. Cl.² .................. H01Q 21/00; G08B 21/00
[58] Field of Search ........... 340/280, 258 R, 258 C, 340/258 B; 179/82; 324/41; 343/866, 867; 325/371, 475, 476, 365

[56] References Cited

UNITED STATES PATENTS

| | | | |
|---|---|---|---|
| 1,555,345 | 9/1925 | Willoughby | 343/107 |
| 1,725,915 | 8/1929 | Hansell | 343/851 |
| 1,740,370 | 12/1929 | Rice | 343/751 |
| 1,863,741 | 6/1932 | Bouthillon | 343/867 |
| 2,122,145 | 6/1938 | Kear et al. | 179/82 |
| 2,252,641 | 8/1941 | Poliakoff et al. | 179/82 |
| 2,597,518 | 5/1952 | Parks | 340/312 |
| 3,182,314 | 5/1965 | Kleist et al. | 343/6.5 |
| 3,493,955 | 2/1970 | Minasy | 340/280 X |
| 3,500,373 | 3/1970 | Minasy | 340/258 |
| 3,617,890 | 11/1971 | Kurauchi | 179/82 X |
| 3,673,334 | 6/1972 | Turner | 179/82 |
| 3,838,409 | 9/1974 | Minasy et al. | 340/280 X |
| 3,868,669 | 2/1975 | Minasy | 340/280 |

FOREIGN PATENTS OR APPLICATIONS

| | | |
|---|---|---|
| 763,681 | 5/1934 | France |
| 1,252,726 | 11/1971 | United Kingdom |

*Primary Examiner*—John W. Caldwell
*Assistant Examiner*—William M. Wannisky
*Attorney, Agent, or Firm*—Fitzpatrick, Cella, Harper & Scinto

[57] ABSTRACT

An electronic theft detection system includes antenna clusters connected to electromagnetic wave transmitter and receiver means. Each antenna cluster comprises a group of spaced apart parallel loops connected in phase opposition or bucking relationship. Electromagnetic waves emitted from the transmitting cluster are detectable close by, i.e., at distances substantially less than one wavelength, but not at far distances due to cancellation effects; and, conversely, electromagnetic waves incident upon the receiving antenna cluster are sensed by it only if they originate from sources close to the cluster, i.e., substantially less than one wavelength.

27 Claims, 4 Drawing Figures

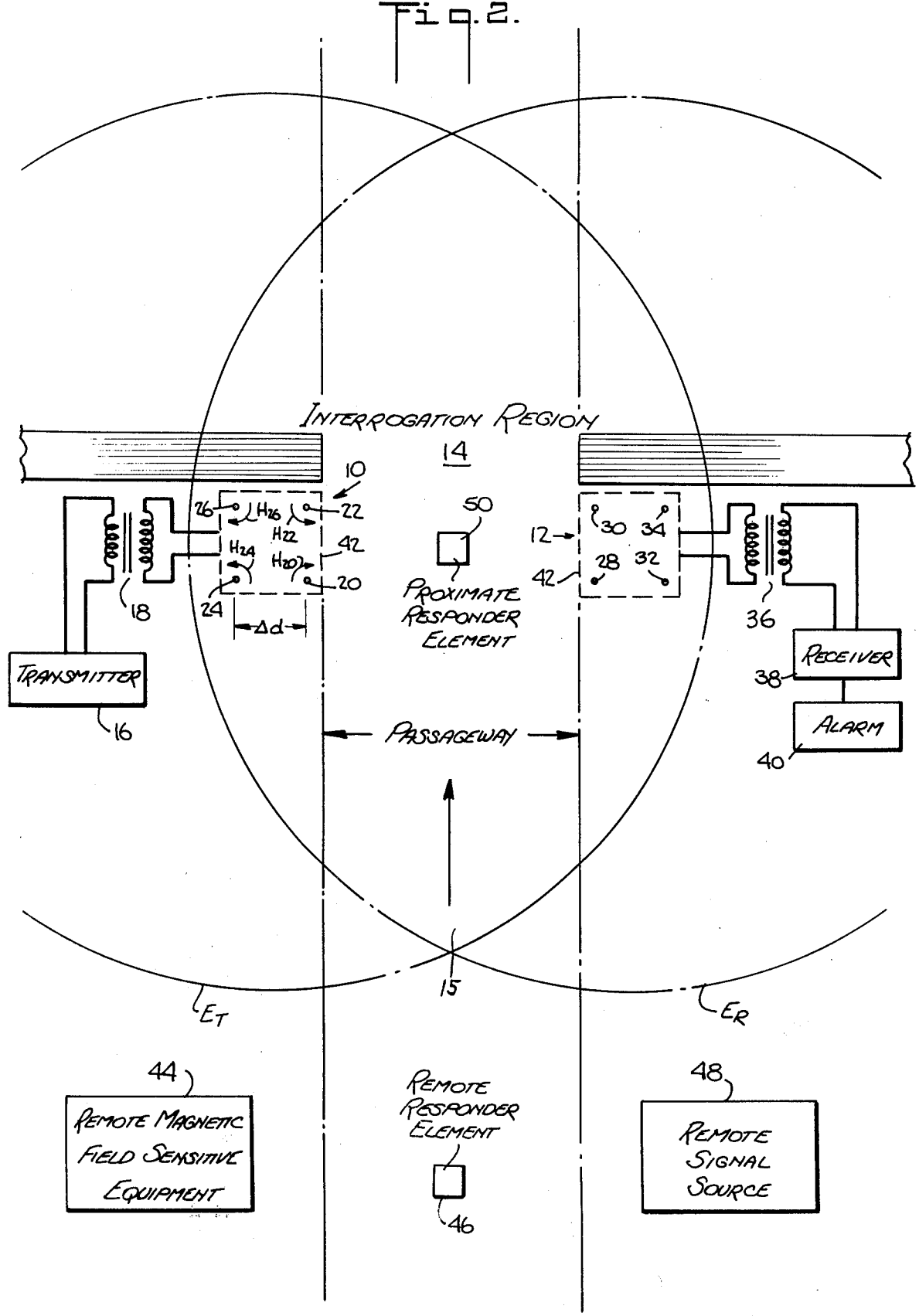

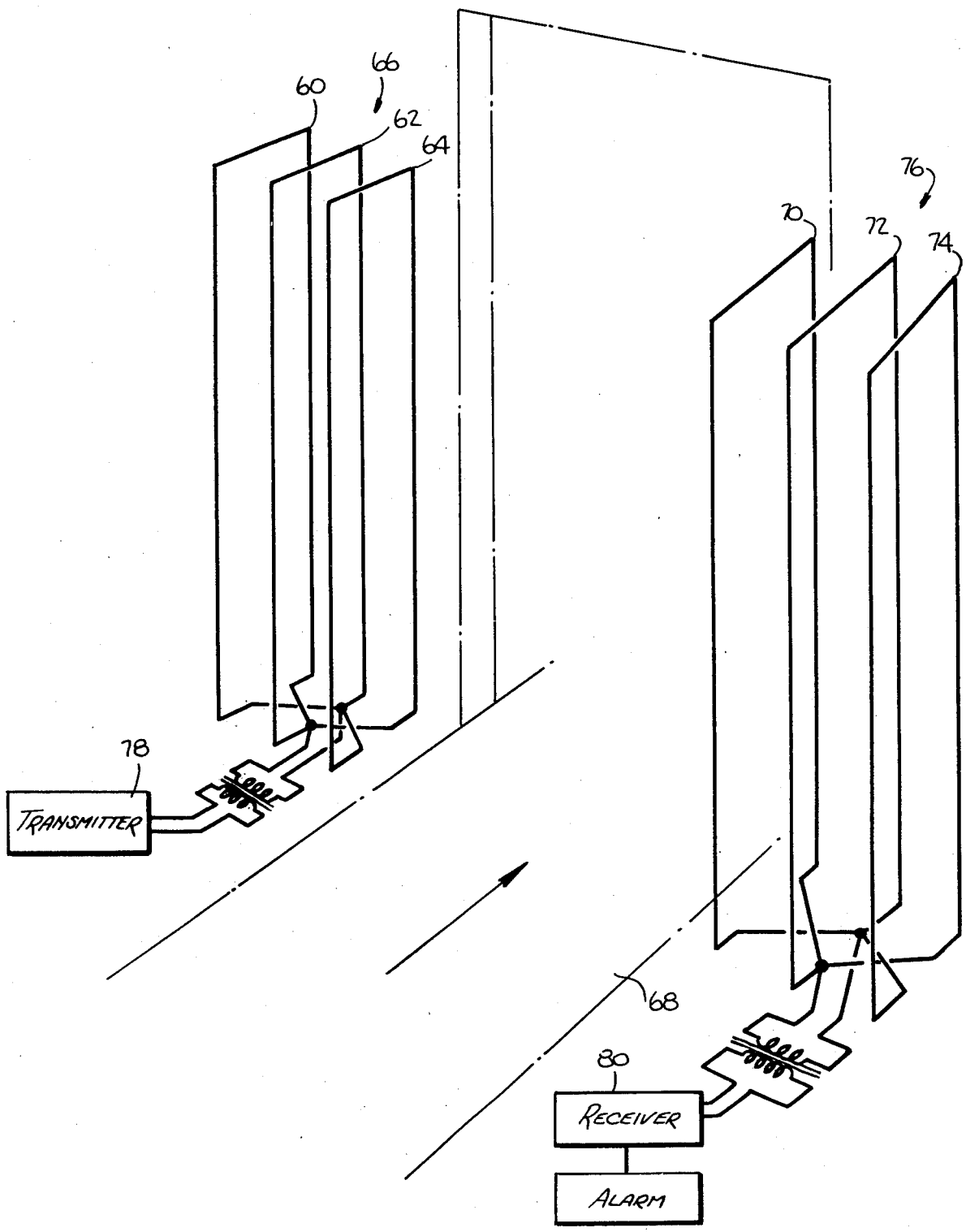

ARTICLE DETECTION SYSTEM WITH NEAR FIELD ELECTROMAGNETIC WAVE CONTROL

BACKGROUND OF THE INVENTION

1. Field of the Invention

This invention relates to electronic detection systems for detecting the movement of articles and more particularly it concerns novel arrangements for controlling electromagnetic fields and waves in the vicinity of such systems so that their range of effectiveness is confined to a predetermined article interrogation region.

2. Description of the Prior Art

The present invention has particular utility in the field of theft detection and will be described herein in such environment; although it will be appreciated that the principles of the present invention may be useful for other applications.

Electronic theft detection systems of the type to which the present invention is applicable are shown and described in U.S. Pat. No. 3,500,373 to A. J. Minasy. The invention, however, has application to other electronic theft detection systems and to other electronic systems which utilize electromagnetic fields and waves where intereference between the system and other electronic equipment presents a problem.

Electronic theft detection systems of the type described in the above identified Minasy patent operate by causing an interrogation antenna, arranged at a store exit or other suitable interrogation region, to produce a continuously changing electro-magnetic field in the vicinity of the interrogation region. Each article of merchandise to be protected has mounted thereon a responder element, which, when placed in the electromagnetic field of the interrogation antenna, causes a change in the antenna field or a generation of a new field; and this in turn is sensed by a receiver means connected either to the interrogation antenna or to a separate detection antenna at the interrogation region. As long as no responder element is brought into the vicinity of the interrogation antenna no signal is detected by the receiver means; but when a responder element passes through the interrogation region its response to the electromagnetic field of the interrogation antenna causes a detectable signal which is sensed and is used to produce an alarm.

It is important that the electromagnetic fields and waves used in electronic theft detection systems be confined to the immediate vicinity of the interrogation region; and, in turn, it is important that the immediate vicinity of the interrogation region be isolated from the fields and waves of other electronic equipment in the area. If this confinement and isolation is not maintained, the equipment may produce false alarms or be otherwise disturbed by receiving unwanted signals within its bandwidth, but produced outside the interrogation region. Also, if the waves and fields produced by the interrogation antenna are not adequately confined, they may adversely affect the operation of other electronic equipment in the vicinity of but outside the interrogation region; or they may violate government regulations. On the other hand, it is also important that the intensity of the electromagnetic energy in the vicinity of the interrogation region be maintained at a sufficiently high level to ensure reliable detection of protected articles which pass through the interrogation region.

One prior art attempt to control electromagnetic energy in an electronic theft detection system is shown in British Pat. No. 1,085,704, published Oct. 4, 1967. In FIG. 2 of that patent there is shown an electrostatic screening in the vicinity of an interrogation region to isolate protected articles from local electrostatic fields. However that electrostatic screening is not effective to confine the output of the interrogation antenna to the vicinity of the interrogation region.

The prior art also shows various antenna arrangements for controlling electromagnetic field and wave radiation patterns. Such antenna arrangements are shown, for example in U.S. Pat. Nos. 1,555,345 to Willoughby, 1,740,370 to Rice, 1,725,915 to Hansell and 1,863,741 to Bouthillon. However, these patents relate only to means for directing radiation to a remote receiver and not to confining the effective electromagnetic field to the vicinity of an article interrogation region.

Other prior patents, such as U.S. Pat. Nos. 2,597,518 to Parks and 3,182,314 to Kleist et al. and French Pat. No. 763,681 to Picard, show antenna loops in twisted configuration for use in electronic article detection systems; however these patents also fail to employ such antenna configurations in a manner so as to control the range of effectiveness of the system; and, as will be seen hereinafter, the purpose of the twisted loop antenna configuration shown in these patents is excluded by the arrangements of the present invention.

SUMMARY OF THE INVENTION

The present invention overcomes the above described difficulties of the prior art. With the present invention it is possible to generate electromagnetic fields and waves of high intensity in the interrogation region of an electronic article detection system while preventing high intensity fields and waves from occurring at locations outside the interrogation region. It is also possible with the present invention to detect selected electromagnetic fields and waves which originate in the interrogation region of an electronic article detection system while avoiding the detection of fields and waves which originate from outside the interrogation region.

According to one aspect of the present invention there is provided a novel detection arrangement comprising an electromagnetic wave transmitter operable to produce electromagnetic wave interrogation signals of predetermined frequency and an electromagnetic wave receiver operable in response to predetermined electromagnetic wave disturbances to produce alarm signals, with the transmitter and receiver each being connected to antenna means positioned adjacent an egress path along which protected articles must pass as they exit from a protected area. These antenna means comprise a group of at least two parallel electrically conductive loops of similar size. The loops are connected in phase opposition so that current always flows in mutually opposite directions through corresponding portions of each loop. Thus, magnetically, the loops are arranged in a "bucking" relationship. The length of and spacing between the loops is a very minor fraction, e.g., one tenth, of the wavelength of the electrical signals which they transmit or receive; however their spacing is an appreciable fraction, e.g., one fourth, of the width of the egress path. The width of the egress path itself, which is defined by a doorway or other limited egress facility forming an interrogation region, is also substantially less in extent than the wavelengths of the electrical signals employed in the system. One such group of bucking antenna loops may be connected to both the transmitter and receiver of the theft detection system or separate pairs of such antenna loops may be provided for the transmitter and for the receiver.

When a protected article moves along the egress path past the antenna loops, a responder element carried on the article responds to the electromagnetic wave interrogation signals produced by the antenna loops to cause a characteristic electro-magnetic disturbance. This disturbance is detected by the receiver; and the receiver in turn operates to produce a suitable audible or visual alarm. No such disturbance is produced or detected when an unprotected article passes by the antenna loops.

At distances remote from the antenna loops, i.e., corresponding to several wavelengths at the frequencies being transmitted or received, the spacing between the loops becomes insignificant by comparison; and the opposed or bucking electromagnetic fields which they generate, when connected to a transmitter, or the opposed electrical signals which they generate, when connected to a receiver, cancel each other at such distances. Thus, the antenna loop arrangement does not transmit effectively over large distances nor does it respond effectively to signals originating from far distances. On the other hand, in areas close to the loops, i.e., substantially within the distance of one wavelength, the difference in distance from a given point to the different loops does become appreciable; so that one loop will have more effect on, or will be more affected by, a responder element at that point, than will another loop in the group. The electrical power levels involved can be kept sufficiently low so that radiation at distances greater than a wavelength divided by $2\pi$, is maintained below standards set by the U.S. Federal Communications Commission (e.g., less than 15 microvolts per meter).

According to another aspect of the invention there is provided in an article detection system means forming a passageway through which articles to be detected must pass. At least two antenna loops are positioned adjacent the passageway and these two loops are arranged parallel to the passageway in spaced apart planes but in alignment with each other. The spacing between the loops is about one fourth the width of the passageway. The loops themselves are both connected to an electomagnetic wave signal processing device such as a transmitter or a receiver, or both. The loop connections are such that the loops are in bucking or phase opposed relationship. The length of any series connection to the loops is substantially less, e.g., less than one tenth of the wavelength of signals processed by the signal processing device.

In one form of the invention three aligned and parallel antenna loops may be provided with the outer loops connected in phase opposition to the loop between them so as to form a symmetrical bucking antenna system.

The present invention also provides automatic compensation for changes in ambient magnetic conditions without appreciably affecting the sensitivity of an electronic detection system. This automatic compensation is obtained by the arrangement of the antenna loops in bucking relationship, i.e. such that a common electrical current through the different loops causes them to produce mutually opposed magnetic fields, and by maintaining the loops closely spaced to each other. Because of the closely spaced relationship of the antenna loops, any changes in ambient conditions will affect each of the loops substantially equally, yet because of their bucking relationship, the changes produced in one loop will be cancelled by those in one or more other loops. On the other hand, because the loops are separated by a finite distance, one loop will be closer to any given location in the checkpoint region so that the presence of a target or responder at that location will affect or will be affected by one antenna loop more than the other.

As will be seen mor fully hereinafter the principles of the present invention apply both to interrogation and to receiving antennas.

There has been outlined rather broadly the more important features of the invention in order that the detailed description thereof that follows may be better understood, and in order that the present contribution in the art may be better appreciated. There are, of course, additional features of the invention that will be described more fully hereinafter. Those skilled in the art will appreciate that the conception on which this disclosure is based may readily be utilized as the basis for the designing of other arrangements for carrying out the several purposes of the invention. It is important, therefore, that this disclosure be regarded as including such equivalent arrangements as do not depart from the spirit and scope of the invention.

BRIEF DESCRIPTION OF THE DRAWINGS

A number of embodiments of the invention have been chosen for purposes of illustration and description and are shown in the accompanying drawings forming a part of this specification, wherein;

FIG. 2 is a plan view of the theft detection system of FIG. 1;

FIG. 4, is a view similar to FIG. 1, but showing an alternate embodiment of the invention.

DETAILED DESCRIPTION OF THE PREFERRED EMBODIMENTS

Figure 1:
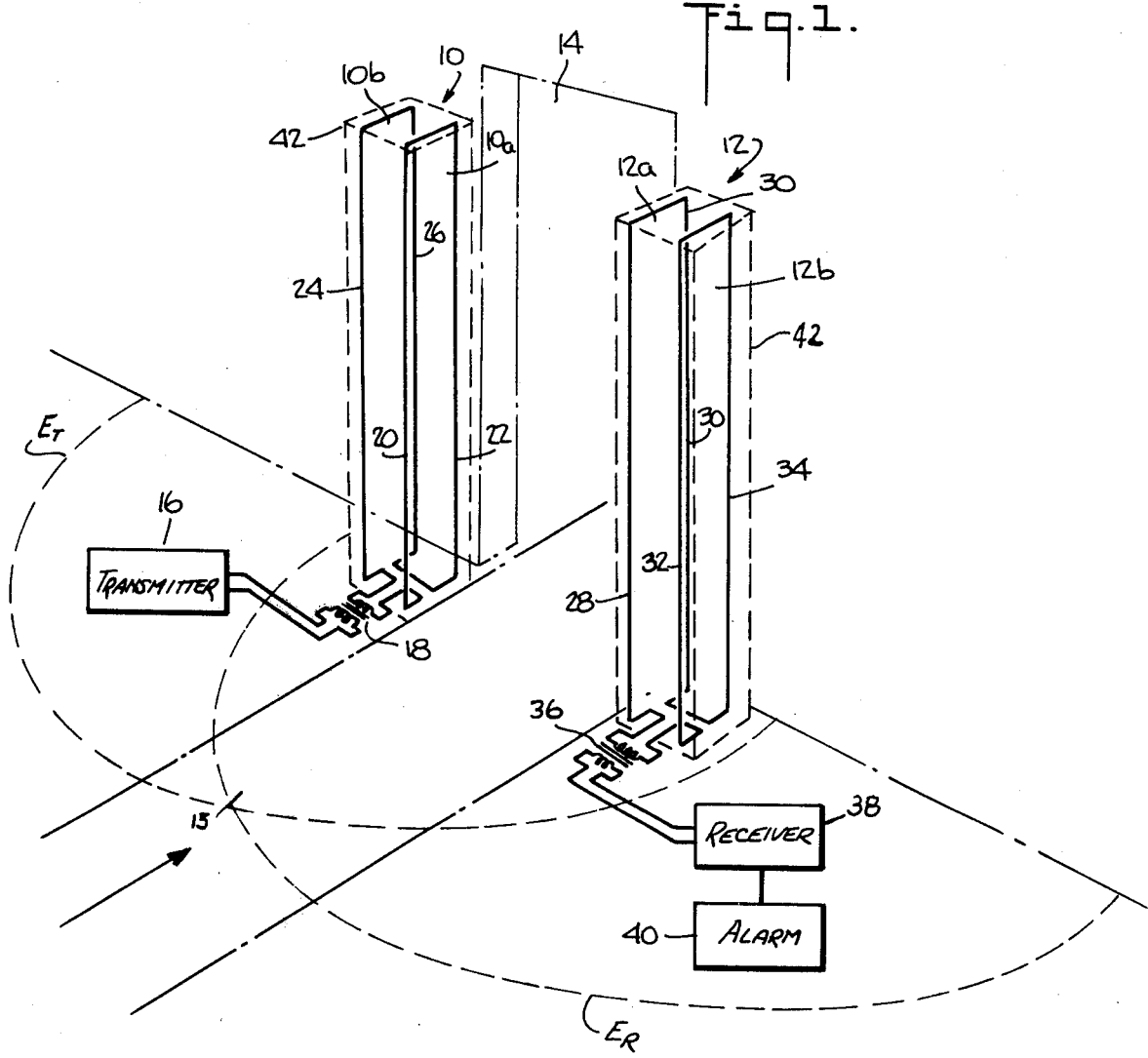
FIG. 1 is a diagramatic view, taken in perspective, of an electronic theft detection system in which the present invention is embodied.

As illustrated diagramatically in FIG. 1 a transmitting or interrogation antenna cluster 10, and a receiving or detection antenna cluster 12 are positioned across from each other on opposite sides, respectively, of a passageway formed by a doorway 14 or other means operative to limit the egress path of protected articles from an enclosure. Each antenna cluster defines a generally circle-shaped region of effectiveness $E_T$ and $R_R$; and these regions each extend across and overlap in the vicinity of the doorway 14 to define an article interrogation region 15. The regions of effectiveness are determined by the power output from the interrogation antenna cluster 10, the characteristics of electrical responders or "targets" attached to protected articles, and the sensitivity of the equipment connected to the detection antenna cluster 12. In general, this power output or sensitivity is set so that whenever protected articles of merchandise, which are equipped with electrical responders or targets, pass through the overlap or interrogation region 15 they respond reliably to electromagnetic energy from the interrogation antenna cluster 10, and produce electromagnetic changes which are capable of being detected at the detection antenna cluster 12. This power level is set so that the checkpoint region is substantially less, e.g., less than one tenth, of a wavelength of the electromagnetic signals employed in the system. As a result no appreciable energy is radiated from or received by the antenna clusters, due to quadrupole effects at larger distances, e.g., several wave-lengths. As will be explained more fully hereinafter, the special antenna arrangement of the present invention effectively cancels electromagnetic field effects in the region between the aforementioned large distances and the outer limits of the interrogation region 15.

A transmitter 16 has outputs connected via a transformer 18 to the interrogation antenna cluster 10. The transmitter 16 includes an oscillator which is operable to produce electrical oscillations and to energize the interrogation antenna cluster so that it produces electromagnetic wave interrogation signals of predetermined frequency in the checkpoint region. In a preferred system, described in U.S. Pat. No. 3,500,373 the transmitter 16 operates to produce electrical oscillations which vary between 1.95 and 2.05 megahertz at a 500 hertz rate. The interrogation antenna cluster 10 comprises four elongated electrical conductors 20, 22, 24 and 26 arranged to extend parallel to each other in an upright direction. These conductors are spaced apart to form the corners of a square cross-sectional figure. Two of the conductors 20 and 22 are connected together at their upper ends to form a first vertically elongated loop 10a which extends parallel to the passageway along one edge thereof. The other two conductors 24 and 26 are also connected together at their upper ends to form a second vertically elongated loop 10b which is parallel to and in alignment with the first loop but positioned back away from the passageway. The spacing between the elongated conductors 20 and 22 of the first loop 10a and the spacing between the elongated conductors 24 and 26 of the second loop 10b are equal to each other and to the spacing between the two loops. The lower ends of the conductors 22 and 26 are connected together so that the two loops 10a and 10b are arranged in series but in phase opposed relationship. That is, electrical current which flows clockwise through the first loop 10a, as viewed from the passageway, is accompanied by a counterclockwise flow current through the other loop 10b. This loop arrangement, wherein series current flow is in opposite directions through the two antenna loops, is referred to herein as a "bucking relationship".

The lower ends of the conductors 20 and 24 are connected across one winding of the transformer 18, while the transmitter 16 is connected across the other winding of the transformer 18.

The detection antenna cluster 12 is essentially the same in structure and arrangement as the interrogation antenna cluster 10. As shown in FIG. 1, the detection antenna cluster 12 comprises four elongated conductors 28, 30, 32 and 34 also arranged to extend parallel to each other in an upright direction; and they are spaced apart to form the corners of a square cross sectioned figure. Two of the conductors, 28 and 30, are connected together at their upper ends to form a first elongated loop 12a which extends parallel to the passageway along one edge thereof. The other two conductors 32 and 34 are also connected together at their upper ends to form a second vertically elongated loop 12b which is parallel to and in alignment with the first loop 12a but is positioned back away from the passageway. The spacing between the elongated conductors 28 and 30 of the first loop 12a and the spacing between the elongated conductors of the second loop 12b are equal to each other and to the spacing between the two loops. The lower ends of the conductors 30 and 34 are connected together so that the two loops 12a and 12b are arranged in series but in phase opposed, i.e., bucking, relationship.

The lower ends of the conductors 28 and 32 are connected across one winding of a transformer 36. A receiver 38 has inputs connected across another winding of the transformer 36. The receiver 38 may, as described in the aforementioned U.S. Pat. No. 3,500,373, respond to the electrical signals produced by the detection antenna cluster 12 when that cluster is subjected to electromagnetic wave disturbances, such as those which occur when a responder is positioned in the interrogation region 15. More specifically, as described in the afornementioned U.S. Pat. No. 3,500,373, the responder may comprise a resonant electrical circuit contained in a wafer of plastic or other suitable material, this circuit being highly tuned to resonate in response to electromagnetic waves at certain frequencies well within the sweep range of the transmitter, i.e. between 1.95 and 2.05 megahertz. Such resonating causes electromagnetic field disturbances which are converted by the detection antenna cluster 12 to corresponding electrical signals which are detected by the receiver 38. An alarm 40 is connected to produce an audio or visual signal when activated by these receiver responses.

The interrogation and detection antenna clusters 10 and 12 may be contained in appropriate housings 42 (shown in dashed outline) of suitable decorative dielectric material such as wood or plastic.

The construction and arrangement of the interrogation and detection antenna clusters 10 and 12 is such that their field of influence is confined to the interrogation region 15; and they are effectively isolated from electromagnetic effects produced outside this region. Thus, as shown in FIG. 2, remote radiation sensitive equipment, such as a radio receiver 44, or a remote responder element 46 located outside the interrogation region, is not affected by electromagnetic fields and waves from the interrogation antenna cluster 10. Further, remote sources of electromagnetic waves and the like, such as electrical machinery 48 located outside the interrogation region do not affect the detection antenna cluster 12. Also any ambient electromagnetic changes are automatically compensated with these antenna arrangements. On the other hand a proximate responder element 50 in the vicinity of the antenna clusters, i.e., in the interrogation region 15, is effective to respond to electromagnetic energy produced by the interrogation antenna cluster and to produce electromagnetic changes which can be detected by the detection antenna cluster 12.

Figure 3:
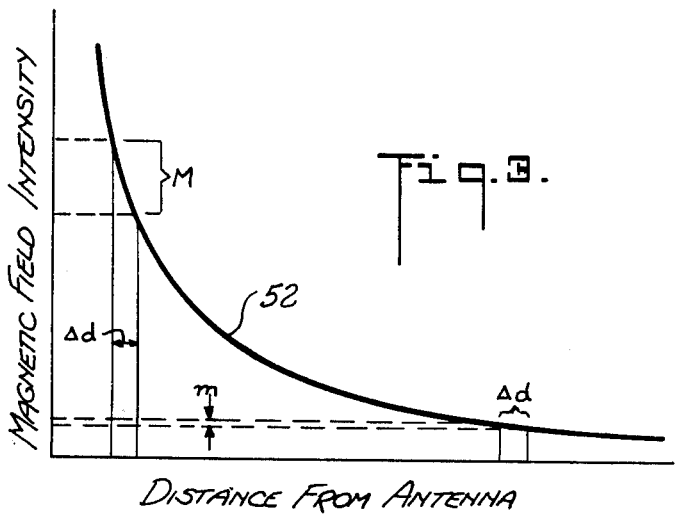
FIG. 3 is a graph showing the relationship between magnetic field intensity and distance from a conductor.

The manner in which the interrogation antenna cluster operates to confine its influence to the interrogation region 15 will now be explained in conjunction with FIGS. 2 and 3. As shown in FIG. 2, at a given instant in time, the flow of electrical current through the various conductors 20, 22, 24 and 26 produces circular magnetic fields represented, respectively, by the arrows $H_{20}$, $H_{22}$, $H_{24}$ and $H_{26}$. Because of the conductor interconnections, the fields $H_{20}$ and $H_{26}$ are clockwise in direction when the fields $H_{22}$ and $H_{24}$ are counterclockwise. In other words, the fields $H_{20}$ and $H_{26}$ are 180° out of phase with respect to the fields $H_{22}$ and $H_{24}$. Now, as represented by the curve 52 of FIG. 3 the intensity or magnitude of a magnetic field produced by current flow through a conductor varies inversely with distance from the conductor. Because of this, two conductors, e.g., conductors 24 and 26 which are separated by a given distance $\Delta d$ produce a large difference M (FIG. 3), in magnetic field intensity at locations close to them, i.e. within the interrogation region 15, but they produce only a small difference $m$, in magnetic field intensity at distant locations, i.e. outside the interrogation region 15. Thus, remotely located equipment, such as the radio receiver 44 and the remote responder element 46, receive magnetic fields of almost equal intensity from each of the conductors 20, 22, 24 and 26. Moreover, because of the relatively large distance from the conductors to the remote equipment, the magnetic field vectors from each of the conductors are in substantial alignment at the location of the remote equipment. Thus, because of the phase relationships mentioned above, two of the four magnetic field vectors are in one direction while the other two are in the opposite direction, and since all of the magnetic fields are of essentially the same intensity, they effectively cancel and produce no effect on the remote equipment.

On the other hand, proximate equipment, such as the proximate responder element 50 in the interrogation region 15, experience a much greater difference in magnetic field intensity from the different conductors 20, 22, 24 and 26. Further, the spacing between the conductors causes their respective magnetic field vectors to assume different angles in the checkpoint region so that a readily detectable magnetic field condition is produced even though two of the conductors are energized 180° out of phase with respect to the other two. As can also be seen from FIG. 3, at far distances, e.g., several times the wavelength of the frequencies employed, the intensity level is so low that any quadrupole type radiation is insignificant.

The manner in which the detection antenna cluster 12 acts to isolate the theft detection system against electromagnetic field disturbances caused by remote magnetic field sources outside the interrogation region 15, such as the electrical machinery 48, will now be explained. As in the case of the interrogation antenna cluster 10, the conductors 28, 30, 32 and 34 of the detection antenna cluster 12 are interconnected such that electrical current flow through the conductors 28 and 34 is in opposition to current flow through the conductors 30 and 32. Further, because of the characteristic curve 52 of FIG. 3, magnetic field disturbances from remote locations outside the interrogation region 15 are of similar intensity at each of the conductors. Moreover, because of the relatively large distance from the remote equipment to the conductors, the magnetic field vectors at the different conductors are substantially parallel. Thus, electrical currents of substantially equal magnitude, direction and phase are produced in each conductor. However, because the conductors are connected in series in a common current path the currents produced in two of the conductors oppose the currents produced in the other two conductors so that the net output of the antenna cluster is substantially zero. The proximate responder element 50 in the interrogation region 15, however, produces magnetic effects which are substantially different both in phase and intensity among the various conductors 28, 30, 32 and 34, so that the resulting signals produced by the conductors do not cancel each other and a detectable signal is produced.

It will be appreciated that the two loops of each antenna cluster are in a bucking relationship. That is, the magnetic field produced by current through one loop opposes the magnetic field produced by current through the other loop. Conversely a given ambient magnetic field disturbance will produce opposite or cancelling current flow effects in the two loops. Further, the two loops of each antenna cluster are spaced closely enough to each other so that they can be balanced reliably; that is, both loops are subjected to essentially the same ambient conditions. Thus any change in ambient conditions will produce essentially an equal and opposite effect in each loop so that the net result on the cluster itself from the ambient change will be zero.

On the other hand, the spacing between the loops permits them to have different influences upon or to respond differently to responder elements in the interrogation region. Although the bucking relationship of the two loops in each antenna cluster would appear to have a deleterious effect upon the sensitivity of the system to the passage of responder elements through the interrogation region, it has been found in a system operating at frequencies in the order of 1.95 – 2.05 megahertz, with the interrogation and detection antenna clusters each comprising a pair of parallel elongated loops 60 inches (150 cm) high by 8 inches (20 cm) wide and separated by 8 inches (20 cm) and arranged on opposite sides of a 30 inch (75 cm) wide passageway, a reduction of noise in the amount of about 50 db, with a corresponding increase in signal to noise ratio, can be obtained. It has been found preferable to maintain the spacing between the loops in each antenna cluster at about one fourth the width of the passageway or distance between the clusters. Also, to avoid any quadrupole type radiation from the antennas and to allow the electrical power level to be low enough that the system will neither generate nor respond to such radiation, the total length of any series connection for the antenna loops should be less than one tenth the wavelength of the frequencies employed.

It will be appreciated that the benefits of the present invention can be obtained with antenna loops of different widths and spacing. Thus, by increasing the antenna loop width and spacing, the effective operating region of the antenna cluster is increased. However, this will also decrease the effective isolation and confinement obtained with antenna system and it will make loop balancing correspondingly more difficult. Also, while the two loops in each of the clusters described above are connected in series, the benefits of the inventions can also be obtained by parallel connected loops, so long as the bucking relationship and loop spacing is maintained. In order to maintain this bucking relationship or phase opposition, the total length of any serial current path through either or both loops should be less than one tenth the wavelength of the frequencies employed.

For certain applications it may be preferable to have the two loops of each cluster arranged coplanar rather than in alignment as shown. Further, a single cluster may be provided, with both the transmitter and receiver connected to it via a common junction in the manner shown in U.S. Pat. No. 3,500,373. It will also be appreciated that the principles of the present invention are applicable to control the effective electromagnetic fields and waves in other electronic theft detection systems, for example, the system shown in French Pat. No. 763,681 to Picard wherein a responder element of a special magnetic material such as "Permalloy" responds to the presence of interrogation signals of a first frequency to generate and emit corresponding electro-magnetic wave signals at one or more harmonics of that frequency.

The system of the aforementioned French patent, it will be noted, employs two different kinds of antennas, i.e., a twisted loop or bucking antenna and a non-twisted surrounding antenna, with one antenna connected to a transmitter and the other connected to a receiver. In the system of the present invention, on the other hand, only one kind of antenna means, i.e., a bucking type, is employed with both the transmitter and the receiver, or aligned antenna loops are arranged on one side of a passageway at a distance from each other about one fourth the width of the passageway. Because of these structural differences, mutually exclusive effects are produced in each system. Thus the electrical balance of the effects of the interrogation antenna upon the receiving antenna or vice versa, which the French patent describes, is not employed in the system of the present invention; and conversely, the confinement of effective field, described above for the present invention, is not obtainable with the system of the French patent. Similar distinction can be made in regard to the above referred to U.S. Patents to Parks and Kleist et al.

FIG. 4 shows an alternate embodiment of the invention wherein three spaced apart parallel antenna loops 60, 62 and 64 are provided in a transmitting antenna cluster 66 on one side of a passageway 68 while three similar spaced apart parallel antenna loops 70, 72 and 74 are provided in a receiving antenna cluster 76 on the opposite side of the passageway. The various loops in each cluster are elongated in the vertical direction and are aligned and spaced apart from each other by substantially equal distances. As in the previous embodiment, the spacing between the loops in each cluster is an appreciable fraction, e.g., one fourth of the distance between the two clusters.

The lower ends of the loops 60, 62 and 64 of the transmitting antenna cluster 66 are connected in parallel to a transmitter 78; however the centermost loop 62 is reverse connected to the transmitter so that electrical currents flow in that loop in phase opposition to the currents which flow in the outermost loops 60 and 64. Thus the loops are connected in bucking relationship. A similar arrangement is provided for the loops 70, 72 and 74 of the receiving antenna cluster 76, which loops are connected to a receiver 80.

In order to achieve proper balance in each cluster the number of ampere turns provided for the loop or loops of one phase should be the same as the number of ampere turns provided for the loop or loops of the opposite phase. Thus the total number of turns in the outermost loops 60 and 64 of the transmitting antenna cluster 66 should equal the number of turns of the centermost loop 62. As in the preceding embodiment the total length of any series connection of turns should be substantially less, e.g., less than one tenth, of a wavelength of the frequencies employed in the transmitter or receiver, so that the bucking relationship of the antenna loops will be preserved.

By using three antenna loops instead of two in each cluster, the effective field of the system can be more sharply defined. Actually this definition will be improved by the use of greater numbers of loops in each cluster, however where more than three loops are employed, the amount of improvement in definition becomes less for each additional loop. The use of three loops in each cluster also permits the maintenance of a condition of symmetry whereby the center of bucking action always remains in the plane of the centermost loop.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

What is claimed and desired to be seured by Letters Patent is:

1. Antenna means for an article detection system which includes means forming an egress passageway of predetermined width through which articles to be detected must pass upon leaving a protected area and which further includes an electromagnetic wave transmitter operative to produce electromagnetic wave interrogation signals of predetermined frequency and an electromagnetic wave receiver operative in response to predetermined electromagnetic wave signal disturbances to produce alarm signals, said antenna means including means for coupling same to said transmitter and to said receiver, said antenna means being positioned adjacent said egress passageway, said antenna means further comprising at least one portion connected to at least one of said transmitter and receiver, said one portion being made up of at least two parallel loops connected in bucking relationship and having a length and spacing between them of substantially less than the wavelength of said interrogation signals and of said predetermined electromagnetic wave disturbances each of said loops having a pair of elongated parallel conductors and being connected to direct current flow in different directions in the two conductors, said loops being positioned with some of said conductors located further back away from said passageway than other conductors.

2. Antenna means according to claim 1 wherein the spacing between the two loops is about one fourth said predetermined width.

3. Antenna means according to claim 1 wherein said transmitter and receiver are each connected to separate ones of said two parallel loops.

4. Antenna means according to claim 1 wherein said two parallel loops are arranged in alignment with each other in closely spaced parallel planes.

5. Antenna means according to claim 4 wherein the spacing between the two loops is about one fourth the distance across said egress passageway.

6. Antenna means according to claim 1 wherein said loops are of substantially equal size.

7. Antenna means according to claim 6 wherein said loops are separated by a distance substantially the same as their width.

8. Antenna means according to claim 7 wherein said loops are elongated in the vertical direction.

9. Antenna means according to claim 8 wherein each loop includes a pair of elongated, substantially straight, conductors spaced apart by a distance substantially less than their length.

10. Antenna means according to claim 9 wherein the two loops are spaced apart by a distance substantially equal to the distance between the elongated conductors in each loop.

11. Antenna means according to claim 9 wherein the elongated conductors of each loop are connected together at one end and wherein the opposite end of two adjacent conductors of different loops are connected to each other.

12. Antenna means according to claim 11 wherein the opposite ends of the two remaining conductors are connected across one winding of a transformer and wherein said transmitter has an output coupled across another winding of said transformer.

13. Antenna means according to claim 10 wherein the elongated conductors of each loop are spaced apart by a distance of about one seventh of their length.

14. Antenna means according to claim 10 wherein the elongated conductors are spaced apart by a distance of about twenty centimeters and wherein the transmitter operates at a frequency of about two megahertz.

15. Antenna means according to claim 14 wherein said predetermined width is about seventy five centimeters.

16. Antenna means according to claim 15 wherein the elongated conductors extend vertically to a height of about one hundred fifty centimeters.

17. Antenna means according to claim 10 wherein the spacing between the elongated conductors is less than one tenth of the signal wavelength produced by said transmitter.

18. Antenna means according to claim 9 wherein the elongated conductors extend vertically.

19. Antenna means according to claim 1 wherein the planes of said loops are parallel to said passageway.

20. Antenna means according to claim 3 wherein said separate ones of said two parallel loops are positioned on opposite sides, respectively, of said egress passageway.

21. Antenna means according to claim 20 wherein said separate ones of said two parallel loops extend parallel to each other.

22. Antenna means according to claim 21 wherein elongated conductors in each of said separate ones of said two parallel loops extend in a vertical direction.

23. Antenna means according to claim 21 wherein the planes of said separate loops are parallel to said egress passageway.

24. Antenna means according to claim 1 comprising three mutually aligned parallel loops connected with the outermost loops in phase opposed, bucking, relationship to the third loop.

25. Antenna means according to claim 24 wherein the width of and spacing between the adjacent loops is about one fourth said predetermined width.

26. Antenna means for an article detection system in which means are provided forming a passageway through which articles to be detected must pass, said antenna means comprising at least two antenna loops positioned adjacent said passageway in spaced apart planes parallel to said passageway, said loops being in mutual alignment and spaced apart from each other by a distance corresponding to about one fourth the distance across said passageway with some of the conductors of said loops lying immediately adjacent the passageway and the other conductors located further back away from the passageway, said antenna loops being connected to an electromagnetic wave processing device in phase opposed bucking relationship to each other.

27. Antenna means according to claim 26 wherein the length of any serial current path through the loops is less than one tenth the wavelength of signals processed by said wave processing device.

* * * * *

UNITED STATES PATENT OFFICE
CERTIFICATE OF CORRECTION

Patent No. 4,016,553  Dated April 5, 1977

Inventor(s) Eugene B. Novikoff and Ronald Pruzick

It is certified that error appears in the above-identified patent and that said Letters Patent are hereby corrected as shown below:

Column 4, line 13, "mor" to read -- more --;

line 16, after the word "has" insert -- thus --;

line 56, "$R_R$" to read -- $E_R$ --.

Signed and Sealed this second Day of August 1977

[SEAL]

Attest:

RUTH C. MASON
Attesting Officer

C. MARSHALL DANN
Commissioner of Patents and Trademarks